(12) United States Patent
Ahn et al.

(10) Patent No.: US 9,846,273 B2
(45) Date of Patent: Dec. 19, 2017

(54) BACKLIGHT UNIT AND DISPLAY DEVICE USING THE SAME

(71) Applicant: LG DISPLAY CO., LTD., Seoul (KR)

(72) Inventors: Sang Hyun Ahn, Paju-si (KR); Young Hun Jeong, Paju-si (KR); Choun Sung Kang, Goyang-si (KR); Yong Ik Hwang, Paju-si (KR); Yong Seok Lee, Paju-si (KR); Hee Kyung Lee, Seoul (KR); Chi Yong Kim, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 154 days.

(21) Appl. No.: 14/577,188

(22) Filed: Dec. 19, 2014

(65) Prior Publication Data

US 2015/0177450 A1 Jun. 25, 2015

(30) Foreign Application Priority Data

Dec. 23, 2013 (KR) .......................... 10-2013-0160968

(51) Int. Cl.
*F21V 8/00* (2006.01)

(52) U.S. Cl.
CPC .......... *G02B 6/0088* (2013.01); *G02B 6/0091* (2013.01); *G02B 6/0093* (2013.01)

(58) Field of Classification Search
CPC ....... G02B 6/0088; G02F 2001/133314; F21V 15/01; H05K 5/0217; H05K 5/0017
USPC ...................................................... 362/217.1
See application file for complete search history.

(56) References Cited

U.S. PATENT DOCUMENTS

| 4,295,712 A * | 10/1981 | Ishiwatari | ........... G02F 1/13394 |
| | | | 349/156 |
| 5,666,261 A * | 9/1997 | Aguilera | ................... B32B 3/12 |
| | | | 165/185 |
| 2005/0264714 A1 | 12/2005 | Hwang et al. | |
| 2010/0110664 A1 | 5/2010 | Cho | |
| 2010/0328557 A1 | 12/2010 | Yamamoto | |
| 2012/0162569 A1 | 6/2012 | Sekiguchi et al. | |
| 2012/0262660 A1 * | 10/2012 | Fujiwara | ................ G02F 1/1333 |
| | | | 349/158 |
| 2013/0170116 A1 | 7/2013 | In et al. | |
| 2013/0170156 A1 * | 7/2013 | Jung | ..................... H05K 5/0017 |
| | | | 361/749 |
| 2013/0335892 A1 * | 12/2013 | Ha | ......................... F16M 11/04 |
| | | | 361/679.01 |
| 2014/0133073 A1 * | 5/2014 | Ahn | ..................... H01L 51/5237 |
| | | | 361/679.01 |

FOREIGN PATENT DOCUMENTS

| CN | 101657674 A | 2/2010 |
| CN | 101660724 A | 3/2010 |

(Continued)

*Primary Examiner* — Robert May
*Assistant Examiner* — Leah S Macchiarolo
(74) *Attorney, Agent, or Firm* — Dentons US LLP

(57) ABSTRACT

Disclosed is a backlight unit and a display device including the same. The backlight unit includes a backlight configured to supply light in one direction, a case that accommodates the backlight, and a cabinet coupled to a top of the case, and configured to include a side wall which faces one direction. The inside of the case has a hive structure. At least one edge region of the case includes a stepped portion which is lower in height than a central region of the case to accommodate the cabinet.

21 Claims, 10 Drawing Sheets

(56) References Cited

FOREIGN PATENT DOCUMENTS

| | | |
|---|---|---|
| CN | 103187009 A | 7/2013 |
| JP | 2006163101 A | 6/2006 |
| JP | 2006184383 A | 7/2006 |
| JP | 2008276035 A | 11/2008 |
| TW | M416777 U | 11/2011 |

* cited by examiner

BACKLIGHT UNIT AND DISPLAY DEVICE USING THE SAME

CROSS-REFERENCE TO RELATED APPLICATIONS

This application claims the benefit of the Korean Patent Application No. 10-2013-0160968 filed on Dec. 23, 2013, which is hereby incorporated by reference for all purposes as if fully set forth herein.

BACKGROUND

Field of the Invention

The present invention relates to a backlight unit and a display device using the same.

Discussion of the Related Art

FIG. 1 illustrates a related art liquid crystal display (LCD) device 10. As illustrated in FIG. 1, the LCD device 10 includes a liquid crystal panel 11, a backlight unit 12 that supplies light toward the liquid crystal panel 11, a guide panel 13 that is coupled to the backlight unit 12 along a circumference surface of the backlight unit 12 and supports the liquid crystal panel 11, and a top case 14 that surrounds an edge of the liquid crystal panel 11.

The backlight unit 12 includes a light source unit 12a, a light guide panel 12b, a housing 12c, and a plurality of optical sheets 12d.

Moreover, the related art LCD device 10 uses a coupling member such as a screw S, for fixing the case top 14, the guide panel 13, and the light source unit 12a.

Therefore, a thickness T of the LCD device 10 is thickened.

Furthermore, since the related art LCD device 10 does not include a separate mechanism that fixes the light guide panel 12b, a position of the light guide panel 12b is changed in the backlight unit 12.

SUMMARY OF THE INVENTION

Accordingly, the present invention is directed to provide a backlight unit and a display device using the same that substantially obviate one or more problems due to limitations and disadvantages of the related art.

An aspect of the present invention is directed a backlight unit, which includes a case of which the inside has a hive structure, an optical sheet having different axes, and a coupling member for integrating the backlight unit, and a display device using the same.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a backlight unit including: a backlight configured to supply light in one direction; a case configured to accommodate the backlight, wherein an inside of the case includes a hive structure; and a cabinet coupled to a top of the case, and configured to include a side wall which faces one direction, wherein at least one edge region of the case includes a stepped portion which is lower in height than a central region of the case to accommodate the cabinet.

In another aspect of the present invention, there is provided a display device including: the backlight unit; a display panel configured to display an image by using light supplied from the backlight unit; and a coupling member disposed on the backlight unit, and configured to couple the display panel to the backlight unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
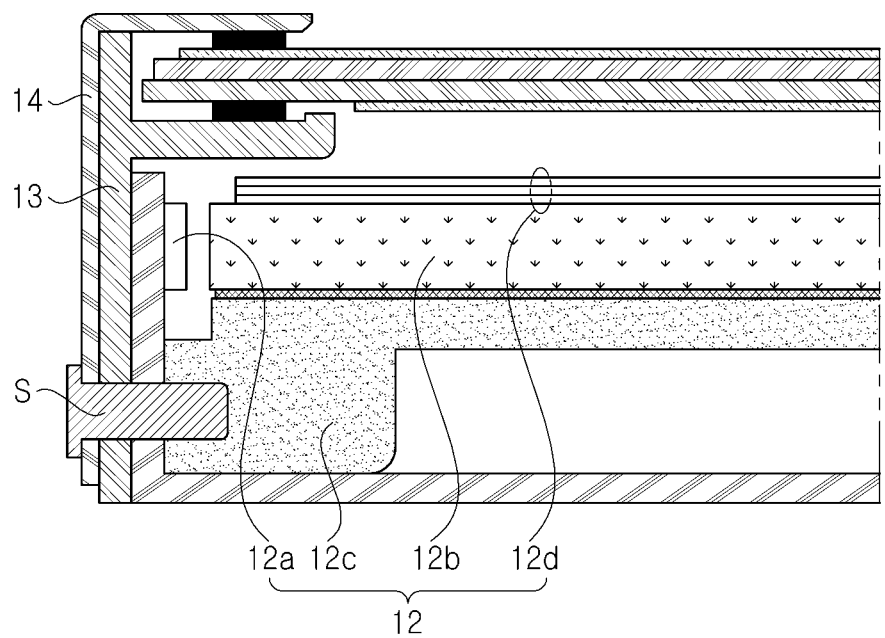
FIG. 1 is a cross-sectional view of a related art LCD device.

Reference will now be made in detail to the exemplary embodiments of the present invention, examples of which are illustrated in the accompanying drawings. Wherever possible, the same reference numbers will be used throughout the drawings to refer to the same or like parts.

The objects, advantages, and features of the present invention will be clarified in detail through embodiments described hereinafter in conjunction with the accompanying drawings. In the specification, in adding reference numerals for elements in each drawing, it should be noted that like reference numerals already used to denote like elements in other drawings are used for elements wherever possible. Terms like a first and a second may be used to describe various elements, but the elements should not be limited by the terms. The terms may be used only as object for distinguishing an element from another element. In the following description, when the detailed description of the relevant known function or configuration is determined to unnecessarily obscure the important point of the present invention, the detailed description will be omitted.

A backlight unit according to an embodiment of the present invention includes: a backlight configured to supply light in one direction; a case configured to accommodate the backlight, wherein an inside of the case includes a hive structure; and a cabinet coupled to a top of the case, and configured to include a side wall which faces one direction, wherein at least one edge region of the case includes a stepped portion which is lower in height than a central region of the case to accommodate the cabinet.

The case may include: a core layer formed of a metal material, and configured to include a plurality of hive structures; a first skin layer coupled to one surface of the core layer; and a second skin layer coupled to the other surface of the core layer.

The case may further include an adhesive layer coupled between the first skin layer and the core layer and between the second skin layer and the core layer.

The backlight may include: a housing coupled to one direction of the cabinet, wherein a light source unit is coupled to an inside of the housing; a light guide panel accommodated in the case, and configured to include a light incident part facing the light source unit; an optical sheet disposed on the light guide panel; and a reflective sheet disposed between the light guide panel and the case. The housing may include a bending part provided in an outer direction.

The housing may include: a horizontal part configured to support a bottom of the cabinet; and a side part configured to extend in one direction from the horizontal part. The bending part may be provided in an outer direction of the side part, and the light source unit may be coupled to an inner side of the side part.

The backlight may further include: a cover member configured to cover a top of the light source unit and a top of a light incident part of the light guide panel; and a coupling member, wherein one end of the coupling member may be coupled to the housing and the cover member or is coupled to the housing, and the other end may be coupled to a rear surface of the housing.

The cover member may include: a top cover configured to cover the top of the light source unit and the top of the light incident part; and a side cover configured to include a plurality of hollow holes which extend from the top cover and are coupled to the bending part provided at the side part of the housing.

In the side part of the housing and the side cover of the cover member, a plurality of first slits may be provided at the same position, and a plurality of second slits may be provided at a rear surface of the housing.

In the side cover of the cover member, a plurality of first slits may be provided, and a plurality of second slits may be provided at a rear surface of the housing.

One end of the coupling member may be coupled to the plurality of first slits to pass through the plurality of first slits which are provided at the side cover of the cover member and the side part of the housing, and the other end of the coupling member may be coupled to the plurality of second slits, and integrates the housing with the cover member.

One end of the coupling member may be coupled to the plurality of first slits, and the other end of the coupling member may be coupled to the plurality of second slits, and may integrate the housing with the cover member.

The optical sheet may include: a first optical pattern provided vertically to an arrangement direction of the light source unit; and a second optical pattern provided vertically to the first optical pattern. A pattern region of the second optical pattern may be broader than a pattern region of the first optical pattern.

The cabinet may have a tetragonal frame shape which includes an opening for exposing the case, and may be coupled to an edge of the case.

A display device according to an embodiment of the present invention includes: the backlight unit; a display panel configured to display an image by using light supplied from the backlight unit; and a coupling member disposed on the backlight unit, and configured to couple the display panel to the backlight unit.

The coupling member may include one selected from a foam pad, an elastic resin, an optical clear adhesive (OCA), and a double-sided tape, and may be disposed at a top of the cabinet facing the display panel.

Hereinafter, embodiments of the present invention will be described in detail with reference to the accompanying drawings.

Figure 2:
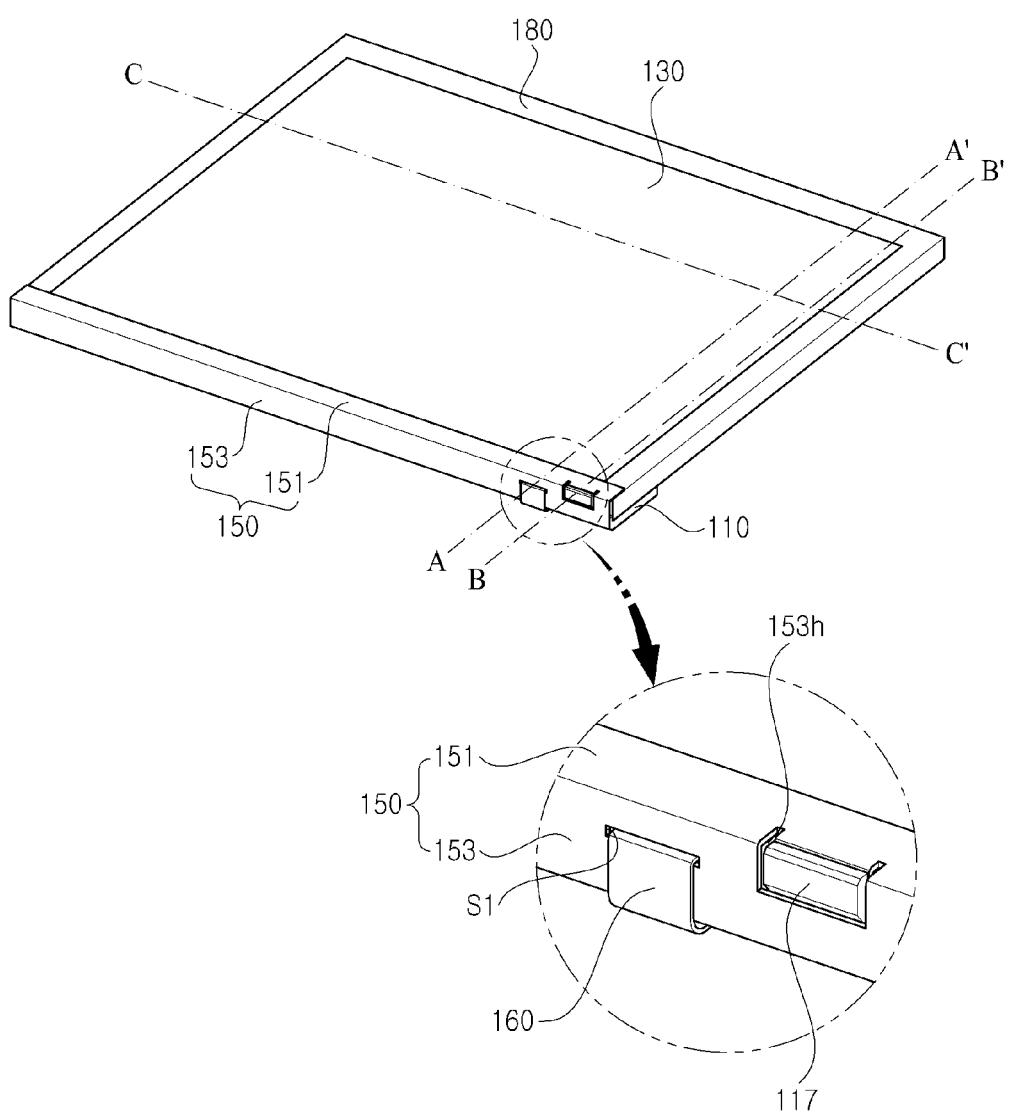
FIG. 2 is a perspective view of a backlight unit according to an embodiment of the present invention.
Figure 3:
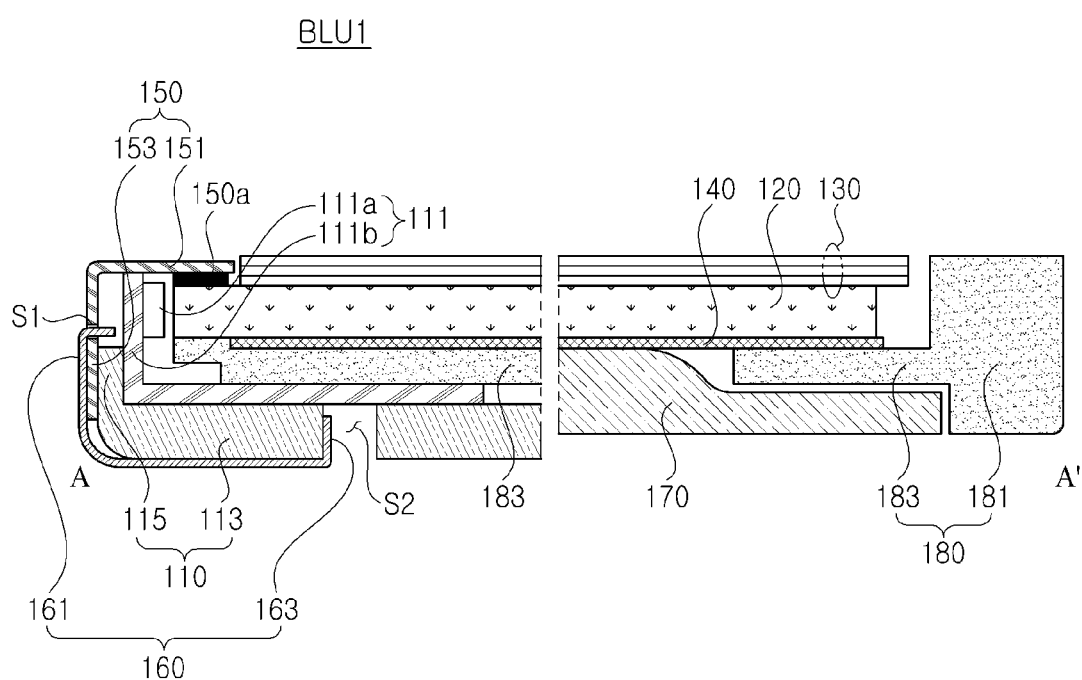
FIG. 3 is a cross-sectional view taken along line A-A' of the backlight unit illustrated in FIG. 2.
Figure 4:
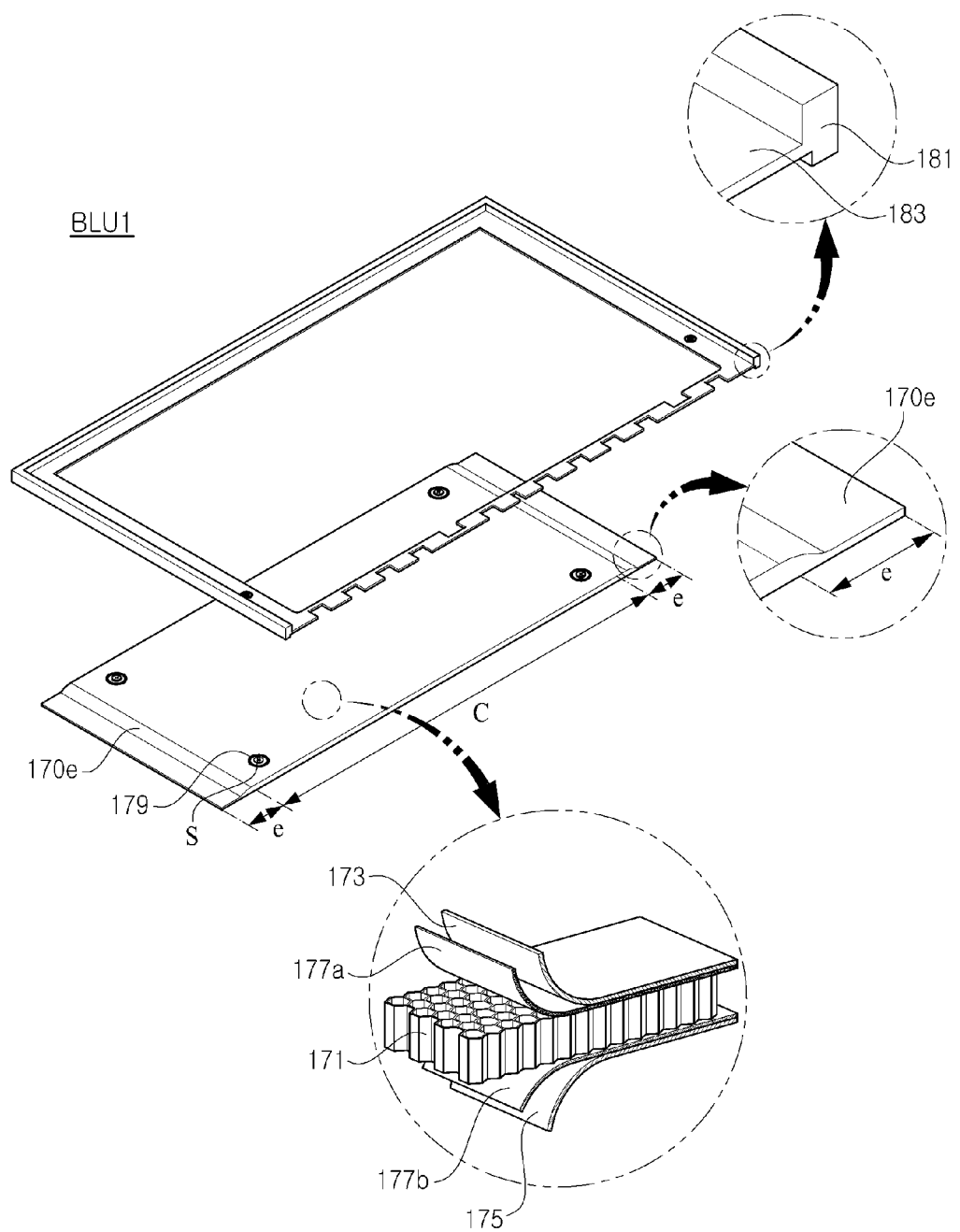
FIG. 4 is a coupling relationship view of a case and a cabinet according to an embodiment of the present invention.

FIG. 2 is a perspective view of a backlight unit according to an embodiment of the present invention. FIG. 3 is a cross-sectional view taken along line A-A' of the backlight unit illustrated in FIG. 2. FIG. 4 is a coupling relationship view of a case and a cabinet according to an embodiment of the present invention.

Figure 5:
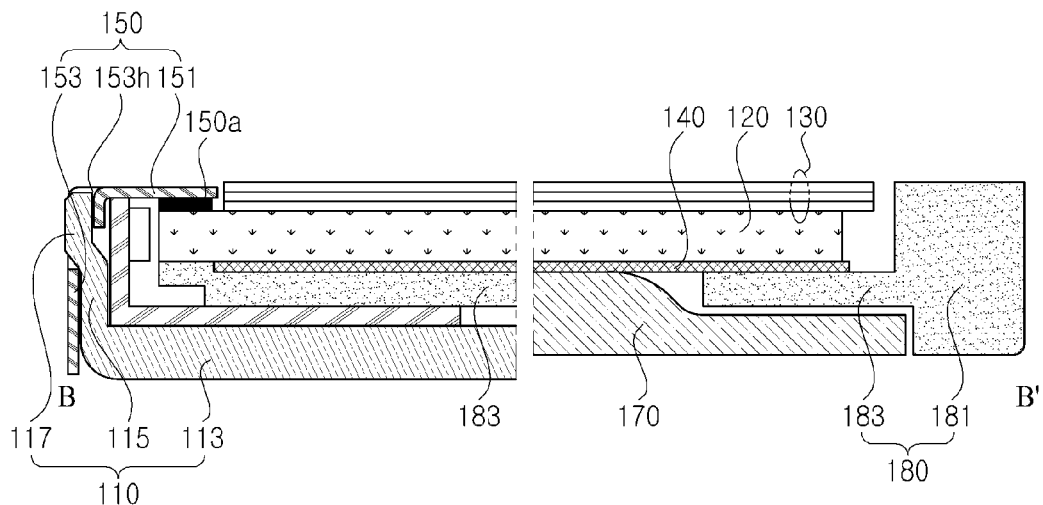
FIG. 5 is a cross-sectional view taken along line B-B' of the backlight unit illustrated in FIG. 2.
Figure 6:
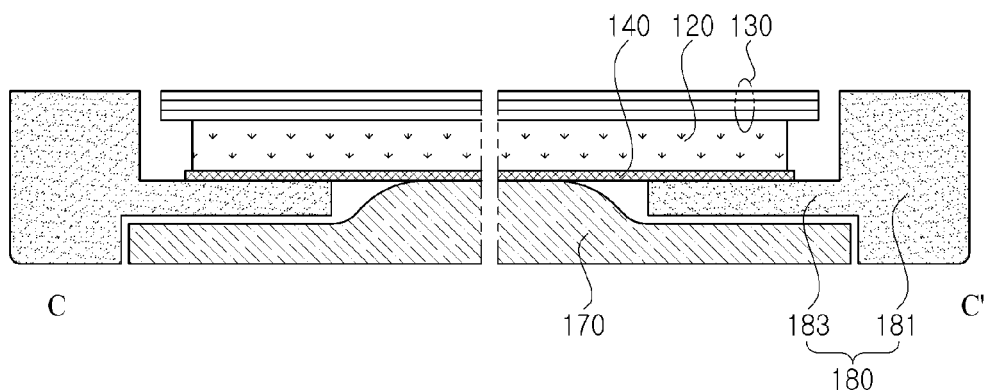
FIG. 6 is a cross-sectional view taken along line C-C' of the backlight unit illustrated in FIG. 2.
Figure 7:
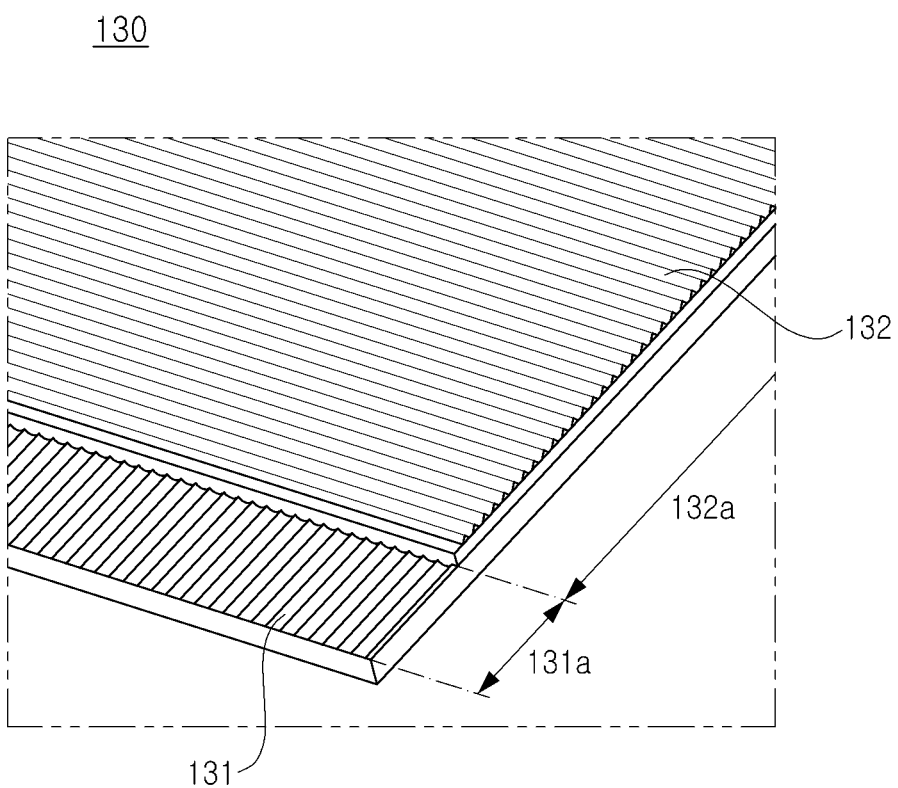
FIG. 7 is a perspective view of an optical sheet according to an embodiment of the present invention.

FIG. 5 is a cross-sectional view taken along line B-B' of the backlight unit illustrated in FIG. 2. FIG. 6 is a cross-sectional view taken along line C-C' of the backlight unit illustrated in FIG. 2. FIG. 7 is a perspective view of an optical sheet according to an embodiment of the present invention.

As illustrated, a backlight unit BLU1 according to an embodiment of the present invention includes a backlight 100, a case 170, and a cabinet 180. The backlight 100 may include a housing 110 coupled to a light source unit 111, a light guide panel 120, an optical sheet 130, a reflective sheet 140, a cover member 150, and a coupling member 160.

In more detail, the light source unit 111 for supplying light in one direction may include a plurality of light emitting diodes (LEDs) 111a and a printed circuit board (PCB) 111b electrically connected to the LEDs 111a.

The housing 110 may include a horizontal part 113, which supports a bottom of the cabinet 180, and a side part 115 that extends in one direction (i.e., a direction in which light is supplied) from the horizontal part 113.

A bending part 117 may be provided in an outer direction of the side part 115 of the housing 110, and the light source unit 111 may be coupled to an inner side of the side part 115.

In more detail, the bending part 117 may be separately provided at the side part 115, or may be provided by bending a partial region of the side part 115.

In the housing 110, a plurality of first slits S1 may be provided at the same position as that of a side cover 153 of a below-described cover bottom 150, and a plurality of second slits S2 may be provided at a rear surface of the housing 110.

One end of the below-described coupling member 160 may be coupled to the first slit S1, and the other end may be coupled to the second slit S2. Accordingly, the housing 110 and the cover member 150 may be integrated and fixed.

The light guide panel 120 may be accommodated in an upper portion of the cabinet 100 to face the light source unit 111, and may supply light, emitted from the light source unit 111, in one direction.

The optical sheet 130 may be disposed at a light output surface that supplies light to a top of the light guide panel 120, namely, in one direction. The optical sheet 130 may include a plurality of sheet groups including a light collecting sheet or a diffusive sheet for collecting and diffusing light which is supplied from a light output part of the light guide panel 120.

In more detail, as illustrated in FIG. 7, at least one optical sheet 130 of the plurality of sheet groups may include a first optical pattern 131 and a second optical pattern 132 which have different optical pattern axes.

A pattern region 132a of the second optical pattern 132 may be broader than a pattern region 131a of the first optical pattern 131.

Each of the first and second optical patterns 131 and 132 may be one of optical patterns such as a lenticular pattern and a prism pattern.

That is, referring to FIG. 7, the first optical pattern 131 adjacent to a light incident part may be provided vertically to an arrangement direction of the light source unit 111, and the second optical pattern 132 may be provided vertically to a pattern direction of the first optical pattern 131.

Therefore, the second optical pattern 132 may be provided in parallel with the arrangement direction of the light source unit 111.

Accordingly, hot spots in which the light incident part adjacent to the light source unit 111 is brighter than the other region can be controlled, and a luminance of the light supplied from the light guide panel 120 can be enhanced.

Moreover, the first optical pattern 131 and the second optical pattern 132 may be provided in one optical sheet, or may be provided by stacking at least two optical sheets.

In more detail, the optical sheet 130 may be provided by stacking a second optical sheet, in which the second optical pattern 132 vertical to the first optical pattern 131 is provided, on a first optical sheet in which the first optical pattern 131 is provided.

The reflective sheet 140 may be disposed between the light guide panel 120 and the case 170, and may reflect light, leaked from the light guide panel 120, to inside the light guide panel 120.

The cover member 150 covers a top of the light source unit 111 and a top of the light incident part of the light guide panel 120 facing the light source unit 111, and prevents the light, supplied from the light source unit 111, from being leaked to outside the backlight unit BLU1.

In more detail, the cover member 150 may be formed of a thin plate of a metal material, and may include a top cover 151 and a side cover 153.

That is, the top cover 151 may be coupled to a top of the housing 110, and may cover the top of the light source unit 111 and the top of the light incident part of the light guide panel 120 facing the light source unit 111.

A protective member 150a may be coupled between the top cover 151 and the top of the light incident part of the light guide panel 120, for preventing the light guide panel 120 from being damaged by the top cover 151.

In more detail, the protective member 150a may be formed of one selected from a foam pad, an elastic resin, and an optical clear adhesive (OCA).

The side cover 153 may extend in a direction from the top cover 151 to a bottom of the backlight unit BLU1, and surround the side part 115 of the housing 110.

A plurality of hollow holes 153h, which are coupled to the bending part 117 provided in an outer direction of the side part 115 of the housing 110, may be provided at an outer side of the side cover 153.

Therefore, the housing 110 and the cover member 150 may be fixedly coupled to each other through a hanging jaw structure which is provided by the bending part 117 of the housing 110 and the hollow holes 153h of the cover member 150.

The plurality of first slits S1 may be provided at the side cover 153 and at the same position as that of the side part 115 of the housing 110.

One end 161 of the coupling member 160 may be coupled to the first slit S1 to pass through the first slit S1 which is provided at the side part 115 of the housing 110 and the side cover 153 of the cover member 150 and at the same position.

Moreover, the other end 163 of the coupling member 160 may be coupled to the second slit S2 which is provided at the rear surface of the housing 110, and thus, the coupling member 160 may have a clip structure such as a ⊏-shape.

Therefore, according to an embodiment of the present invention, by using the coupling member 160 having a ⊏-shape, the housing 110 may be fixedly coupled to the cover member 150.

A shape of the coupling member 160 according to an embodiment of the present invention may be variously changed in design, in addition to a ⊏-shape.

As illustrated in FIG. 3, since the other end 163 of the coupling member 160 is coupled to the second slit S2 which is provided at the rear surface of the housing 110, the coupling member 160 may naturally pressurize the cover member 150 in a lower direction of the backlight unit BLU1.

In the backlight unit BLU1 according to an embodiment of the present invention, the cover member 150 restricts a movement of the light guide panel 120 by using a coupling structure between the housing 110, the cover member 150, and the coupling member 160, and thus can prevent the light guide panel 120 from being moved in the backlight unit BLU1 or being shaken in one direction.

Moreover, by using the coupling member 160 having the above-described clip structure, a slip phenomenon which occurs between the housing 110 and the cover member 150 can be prevented by a hanging jaw structure between the housing 110 and the cover member 150.

That is, unlike the related art, the backlight unit BLU1 according to an embodiment of the present invention has a slim structure in thickness and thus, it is impossible to use an additional fixing member such as a screw.

Therefore, by using the hanging jaw structure between the housing 110 and the cover member 150 and the clip structure using the coupling member 160, the backlight unit BLU1 according to an embodiment of the present invention can be slimmed without using an additional fixing member, and a coupling durability of the backlight unit BLU1 can be enhanced.

Moreover, although not shown, the first slit S1 may be provided in only a direction of the side cover 153 of the cover member 150, and the second slit S2 may be provided at the rear surface of the housing 110.

That is, unlike the details described above with reference to FIG. 3, the first slit S1 is not provided at the side part 115 of the housing 110, and is provided at the side cover 153 of the cover member 150.

Therefore, the one end 161 of the coupling member 160 may be coupled to the first slit S1 which is provided at the side cover 153 of the cover member 150, and the other end 163 may be coupled to the second slit S2 which is provided at the rear surface of the housing 110. Accordingly, the one end 161 of the coupling member 160 is thinner than the other end 163.

Referring to FIG. 4, the case 170 may be formed of a metal material, and may accommodate the light source unit 111, the housing 110, the light guide panel 120, the light optical sheet 130, and the reflective sheet 140 which configure the above-described backlight 100. The inside of the case 170 may have a hive structure.

In more detail, the case 170 may include a core layer 171, a first skin layer 173, a second skin layer 175, and a plurality of adhesive layers 177a and 177b. The adhesive layers 177a and 177b may be formed of a thermoplastic material.

The core layer 171 may have a plurality of hive structures. Therefore, a thickness of the core layer 171 is thinned, and a weight of the core layer 171 is reduced. Also, specific strength "σ" (which is obtained by dividing strength by specific weight "ρ"), non-rigidity (which is obtained by dividing elasticity modulus "E" by specific weight "ρ"), and torsional stress are enhanced.

An edge region e of the case 170 may have a stepped portion 170e having a round shape which is lower in height than a central region c of the case 170 so as to accommodate the cabinet 180.

Therefore, when the cabinet 180 is disposed in the edge region e of the case 170, a top of the cabinet 180 and a top of the case 170 are disposed on the same plane.

In order for the stepped portion 170e to be provided in the edge region e of the case 170, the case 170 including the core layer 171 having a hive structure may use a hot press forming process using heat.

In this case, the core layer 171 is broken in the hot press forming process, and for this reason, strength and rigidity are reduced. However, the adhesive layers 177a and 177b formed of a thermoplastic material are coupled to both surfaces of the core layer 171 configuring the case 170, and thus, even when a core layer in the edge region e to which the hot press forming process is applied is broken, strength and rigidity are not reduced.

In addition, in order for a fixing member such as a screw S to be coupled to the case 170, a coupling part 179 provided at the case 170 may be provided by using the hot press forming process or a press forming process. In this case, a head of the screw S can be prevented from protruding to outside the case 170.

The cabinet 180 may be coupled to an upper portion of the case 170, namely, the edge region e of the case 170. The cabinet 180 may include a side wall 181, which faces one direction, and a supporting surface 183 that supports the light guide panel 120.

In more detail, the cabinet 180 may be formed of a plastic material, and may include an opening 180h for externally exposing the other region except the edge region e of the case 170. The cabinet 180 may be formed of a tetragonal frame.

The side wall 181 of the cabinet 180 may be provided in a direction of a light non-incident part with reference to FIGS. 3, 5 and 6.

That is, referring to FIGS. 3 and 5, the side wall 181 of the cabinet 180 may not be provided in a direction of the light incident part that is a direction in which the light source unit 111 is coupled to the housing 110.

Figure 8:
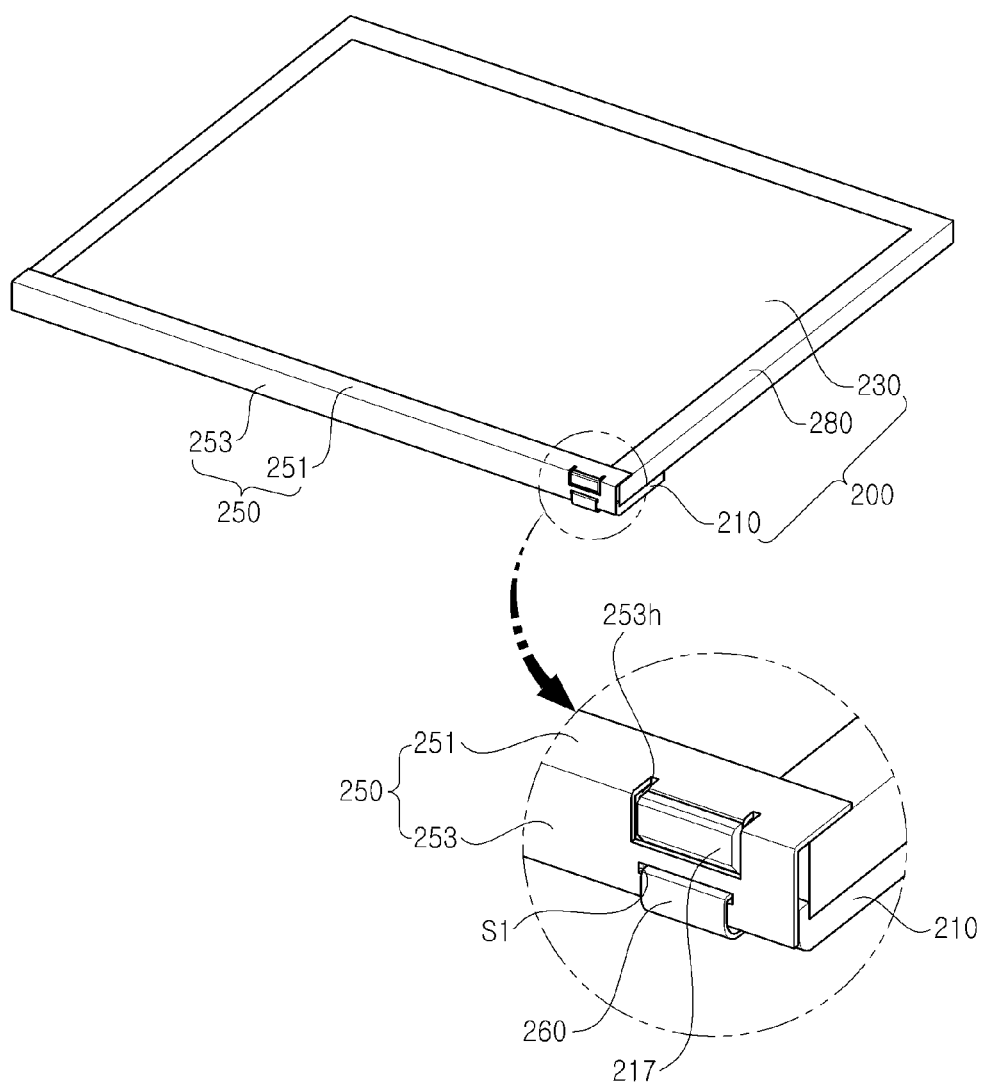
FIG. 8 is a perspective view of a backlight unit according to another embodiment of the present invention.

FIG. 8 is a perspective view of a backlight unit according to another embodiment of the present invention. In describing the present embodiment, descriptions on elements which are the same as or correspond to the preceding embodiment are omitted. Hereinafter, a display device according to an embodiment of the present invention will be described with reference to FIG. 8.

Similarly to the backlight unit BLU1 according to an embodiment of the present invention described above with reference to FIGS. 2 to 7, a backlight unit BLU2 according to another embodiment of the present invention includes a backlight 200, a case (not shown), and a cabinet 280. The backlight 200 may include a housing 210 coupled to a light source unit, a light guide panel (not shown), an optical sheet 230, a reflective sheet (not shown), a cover member 250, and a coupling member 260.

In this case, a first slit S1 which is provided at a side cover 253 of the cover member 250 and a side part of the housing 210 may be provided under a hanging jaw structure which is provided by a bending part 217 of the housing 210 and a hollow hole 253h of the cover member 250.

Therefore, a clip structure using the coupling member 260 may be provided under the hanging jaw structure.

Figure 9:
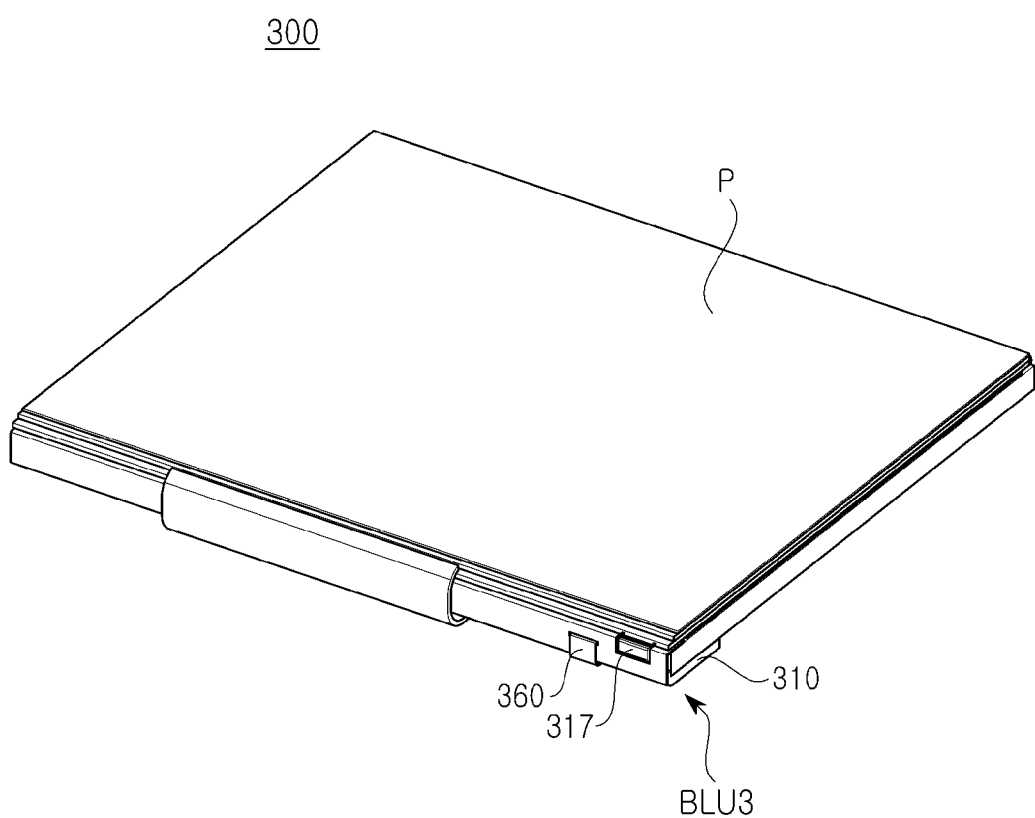
FIG. 9 is a perspective view of a display device according to an embodiment of the present invention.
Figure 10:
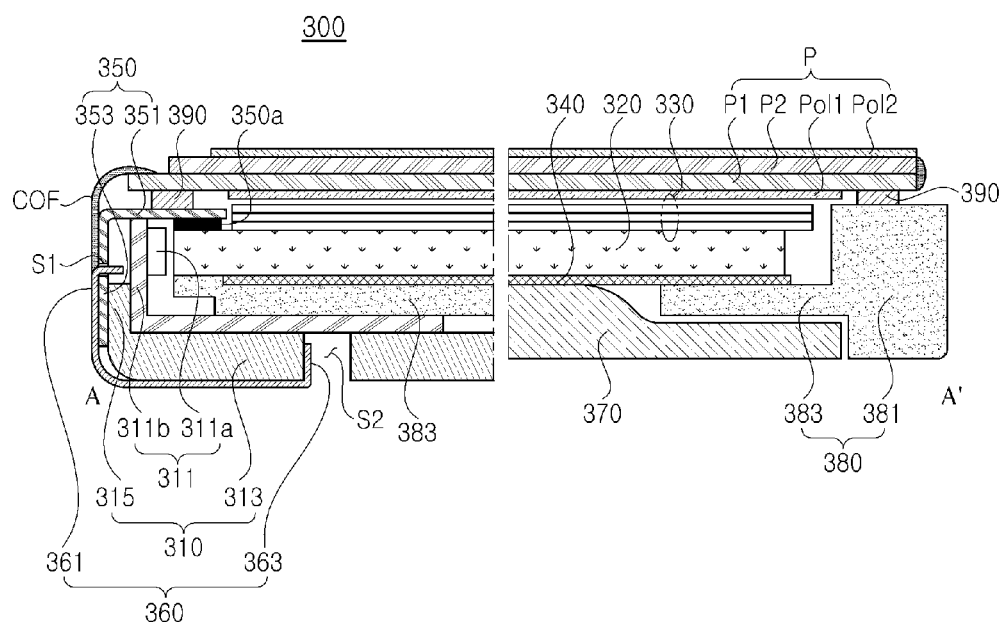
FIG. 10 is a cross-sectional view taken along line A-A' of the display device illustrated in FIG. 9.
Figure 11:
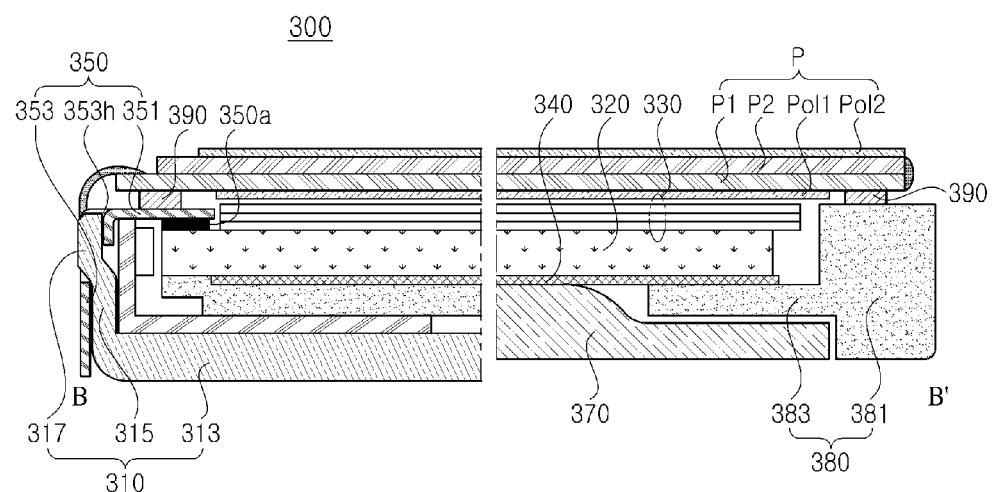
FIG. 11 is a cross-sectional view taken along line B-B' of the display device illustrated in FIG. 9.
Figure 12:
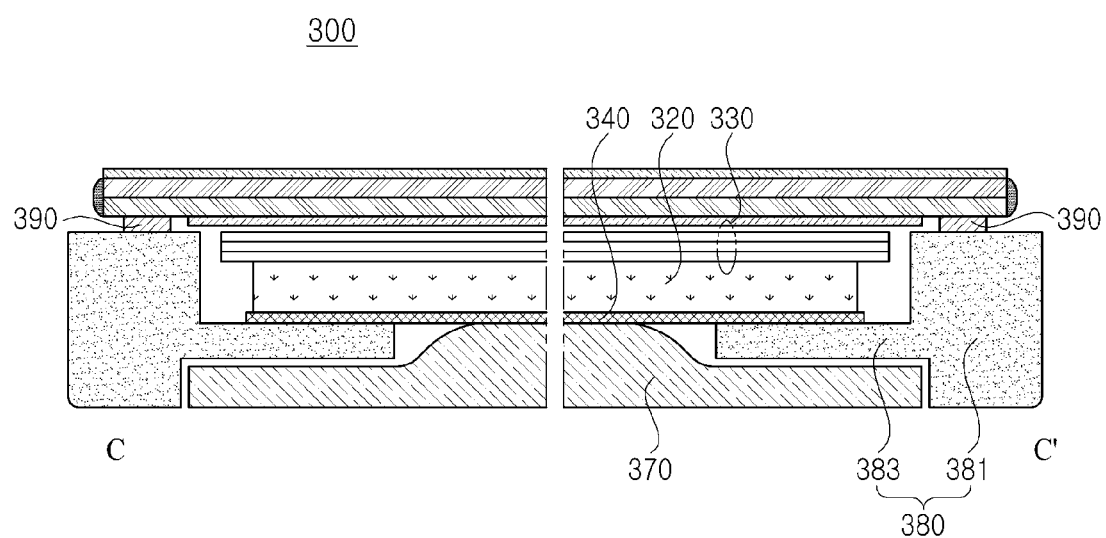
FIG. 12 is a cross-sectional view taken along line C-C' of the display device illustrated in FIG. 9.

FIG. 9 is a perspective view of a display device according to an embodiment of the present invention. FIG. 10 is a cross-sectional view taken along line A-A' of the display device illustrated in FIG. 9. FIG. 11 is a cross-sectional view taken along line B-B' of the display device illustrated in FIG. 9. FIG. 12 is a cross-sectional view taken along line C-C' of the display device illustrated in FIG. 9.

In describing the present embodiment, descriptions of elements which are the same as or correspond to the above-described embodiment of the backlight unit are omitted. Hereinafter, a display device according to an embodiment of the present invention will be described with reference to the drawings.

In more detail, a display device 300 according to an embodiment of the present invention includes a backlight unit BLU3, a display panel P, and a coupling member 390.

In more detail, similarly to the above-described backlight units BLU1 and BLU2, a backlight unit BLU3 includes a backlight 300, a case 370, and a cabinet 380. The backlight 300 may include a housing 310 coupled to a light source unit 311, a light guide panel 320, an optical sheet 330, a reflective sheet 340, a cover member 350, and a coupling member 360.

The light source unit 311 may include a plurality of LEDs 311a and a PCB 311b electrically connected to the LEDs 311a.

The housing 310 may include a horizontal part 313, which supports a bottom of the cabinet 380, and a side part 315 that extends in one direction (i.e., a direction in which light is supplied) from the horizontal part 313.

The light guide panel 320 may be accommodated in an upper portion of the cabinet 300 to face the light source unit 311, and may supply light, emitted from the light source unit 311, in one direction.

The optical sheet 330 may be disposed at a light output surface that supplies light to a top of the light guide panel 320, namely, in one direction. The optical sheet 330 may include a plurality of sheet groups including a light collecting sheet or a diffusive sheet for collecting and diffusing light which is supplied from a light output part of the light guide panel 320.

In more detail, the optical sheet 330 may include a first optical pattern 331 and a second optical pattern 333 which have different optical pattern axes.

The reflective sheet 340 may be disposed between the light guide panel 320 and the case 370, and may reflect light, leaked from the light guide panel 320, to inside the light guide panel 320.

The cover member 350 covers a top of the light source unit 311 and a top of the light incident part of the light guide panel 320 facing the light source unit 311, and prevents the light, supplied from the light source unit 311, from being leaked to outside the backlight unit BLU3.

In more detail, the cover member 350 may be formed of a thin plate of a metal material, and may include a top cover 351 and a side cover 353.

One end 361 of the coupling member 360 may be coupled to the first slit S1 to pass through the first slit S1 which is provided at the side part 315 of the housing 310 and the side cover 353 of the cover member 350 and at the same position.

Moreover, the other end 363 of the coupling member 360 may be coupled to the second slit S2 which is provided at the rear surface of the housing 310, and thus, the coupling member 360 may have a clip structure such as a ⊏-shape.

The case 370 may be formed of a metal material, and may accommodate the light source unit 311, the housing 310, the light guide panel 320, the light optical sheet 330, and the reflective sheet 340 which configure the above-described backlight 300. The inside of the case 370 may have a hive structure.

In more detail, the case 370 may have the same structure as that of the case 170 described above with reference to FIG. 4.

The cabinet 380 may be coupled to an upper portion of the case 370, namely, an edge region e of the case 370. The cabinet 380 may include a side wall 381, which faces one direction, and a supporting surface 383 that supports the light guide panel 320.

A display panel P displays an image to a user by using light supplied from the backlight unit BLU3, and may include a first substrate p1 in which a thin film transistor (TFT) is formed, a first polarizing member (pol 1) coupled to one side of the first substrate p1, a second substrate p2 in which a color filter is formed, and a second polarizing member (pol 2) coupled to one side of the second substrate p2. A liquid crystal layer (not shown) may be coupled between the first substrate p1 and the second substrate p2.

The coupling member 390 is disposed on the backlight unit BLU3, and couples the display panel P to the backlight unit BLU3. The coupling member 390 may be formed of one selected from a foam pad, an elastic resin, an optical clear adhesive (OCA), and a double-sided tape.

In more detail, as illustrated in FIGS. 10 to 12, the coupling member 390 may be disposed at a top of the cabinet 380 facing the display panel P.

As described above, according to the embodiments of the present invention, the backlight unit is lighter and slimmer by using the case of which the inside has a hive structure.

Moreover, according to the embodiments of the present invention, by using the coupling member, the light guide panel can be prevented from being moved and lifted in the backlight unit.

Moreover, according to the embodiments of the present invention, by using the optical sheet including the plurality of optical patterns having different axial directions, hot spots are controlled, and luminance can be enhanced.

Hereinabove, the embodiments of the present invention have been described in detail, but the backlight unit and the display device according to the embodiments of the present invention are not limited thereto. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit comprising:
a backlight configured to supply light in one direction;
a case configured to accommodate the backlight, wherein an inside of the case includes a hive structure; and
a cabinet coupled to a top of the case, and configured to include a side wall which faces one direction,
wherein at least one edge region of the case comprises a stepped portion which is lower in height than a central region of the case to accommodate the cabinet,
wherein the backlight comprises:
a housing coupled to one direction of the cabinet, wherein a light source unit is coupled to an inside of the housing;
a light guide panel accommodated in the case, and configured to include a light incident part facing the light source unit;
an optical sheet on the light guide panel; and
a reflective sheet between the light guide panel and the case, and
the housing comprises a bending part provided in an outer direction,
wherein the side wall further includes a supporting surface that supports the backlight, and the side wall is between the stepped portion and the light guide panel.

2. The backlight unit of claim 1, wherein the case comprises:
a core layer formed of a metal material, and configured to include a plurality of hive structures;
a first skin layer coupled to one surface of the core layer; and
a second skin layer coupled to the other surface of the core layer.

3. The backlight unit of claim 2, wherein the case further comprises an adhesive layer coupled between the first skin layer and the core layer and between the second skin layer and the core layer.

4. The backlight unit of claim 1, wherein, the housing comprises:
a horizontal part configured to support a bottom of the cabinet; and
a side part configured to extend in one direction from the horizontal part, and
the bending part is provided in an outer direction of the side part, and the light source unit is coupled to an inner side of the side part.

5. The backlight unit of claim 4, wherein the backlight further comprises:
a cover member configured to cover a top of the light source unit and a top of a light incident part of the light guide panel; and
a coupling member, wherein one end of the coupling member is coupled to the housing and the cover member or is coupled to the housing, and the other end is coupled to a rear surface of the housing.

6. The backlight unit of claim 5, wherein the cover member comprises:
a top cover configured to cover the top of the light source unit and the top of the light incident part; and
a side cover configured to include a plurality of hollow holes which extend from the top cover and are coupled to the bending part provided at the side part of the housing.

7. The backlight unit of claim 5, wherein in the side part of the housing and the side cover of the cover member, a plurality of first slits are provided at the same position, and a plurality of second slits are provided at a rear surface of the housing.

8. The backlight unit of claim 7, wherein, one end of the coupling member is coupled to the plurality of first slits to pass through the plurality of first slits which are provided at the side cover of the cover member and the side part of the housing, and the other end of the coupling member is coupled to the plurality of second slits, and integrates the housing with the cover member.

9. The backlight unit of claim 5, wherein in the side cover of the cover member, a plurality of first slits are provided, and a plurality of second slits are provided at a rear surface of the housing.

10. The backlight unit of claim 9, wherein, one end of the coupling member is coupled to the plurality of first slits, and the other end of the coupling member is coupled to the plurality of second slits, and integrates the housing with the cover member.

11. The backlight unit of claim 1, wherein, the optical sheet comprises:
a first optical pattern provided vertically to an arrangement direction of the light source unit; and
a second optical pattern provided vertically to the first optical pattern, and
a pattern region of the second optical pattern is broader than a pattern region of the first optical pattern.

12. The backlight unit of claim 1, wherein the cabinet has a tetragonal frame shape which includes an opening for exposing the case, and is coupled to an edge of the case.

13. A display device comprising:
a backlight unit comprising:
a light guide panel configured to supply light in one direction;
a case configured to accommodate the light guide panel, wherein an inside of the case includes a hive structure; and
a cabinet coupled to a top of the case, and configured to include a side wall which faces one direction,
wherein at least one edge region of the case comprises a stepped portion which is lower in height than a central region of the case to accommodate the cabinet;
a display panel configured to display an image by using light supplied from the backlight unit; and
a coupling member disposed on the backlight unit, and configured to couple the display panel to the backlight unit;
wherein the side wall further includes a supporting surface that supports the light guide panel, and the side wall is disposed between the stepped portion and the light guide panel.

14. The display device of claim 13, wherein the coupling member comprises one selected from a foam pad, an elastic resin, an optical clear adhesive (OCA), and a double-sided tape, and is disposed at a top of the cabinet facing the display panel.

15. A backlight unit comprising:
a light source;
a guide panel;
a case configured to accommodate the light source and the guide panel, and includes a hive structure; and
a cabinet coupled to at least one edge region of the case, and configured to includes a side wall which faces one direction,
wherein the at least one edge region of the case comprises a stepped portion which is lower in height than a central region of the case,
wherein the side wall further includes a supporting surface that supports the guide panel, and the supporting surface between the guide panel and the stepped portion.

16. The backlight unit of claim 15, wherein the side wall is located between the guide panel and the at least one edge region of the case.

17. The backlight unit of claim 15, wherein the supporting surface and a top of the central region of the case are located on a same plane.

18. The backlight unit of claim 15, wherein the stepped portion having a round shape.

19. An apparatus comprising:
a light guide plate configured to guide light to display panel elements thereon;
a rectangular frame configured to have a ledge protruding from and along inner surfaces of at least two opposing walls, the ledge having a front surface and a rear surface, the front surface configured to accommodate the light guide plate and the display panel elements thereon; and
a plate-like back cover attached to a rear portion of the frame and having a flat rear surface and a front protruding main region that encloses a core of aluminum honeycomb-like structures sandwiched between front and back skin layers,
wherein the ledge is located between the light guide plate and the flat rear surface.

20. The apparatus of claim 19, wherein the back cover additionally has at least two edges along two opposing sides of the main region, the two edges configured to have a particular width to allow attachment of the back cover to the rear surface of the ledge of the frame.

21. The apparatus of claim 20, wherein the outer surface of the main region of the back cover is configured to be relatively flush with the front surface of the ledge of the frame to provide direct contact support to the rear surface of the light guide plate.

* * * * *